United States Patent [19]

McLaren et al.

[11] Patent Number: 5,490,883
[45] Date of Patent: Feb. 13, 1996

[54] SOLUTION AND METHOD FOR CLEANING MARBLE SURFACES

[75] Inventors: Kevin P. McLaren; Diane M. Scheele, both of Aurora, Ill.

[73] Assignee: The ServiceMaster Company, L.P., Downers Groves, Ill.

[21] Appl. No.: 260,757

[22] Filed: Jun. 16, 1994

[51] Int. Cl.$^6$ .............................. B08B 1/00; C04B 41/50; B24B 1/00; C11D 7/60
[52] U.S. Cl. ........................ 134/3; 134/4; 134/2; 252/136; 252/173; 252/142; 252/147; 252/389.24; 252/389.3; 252/DIG. 14; 252/407; 252/170; 427/355; 427/368; 427/344; 106/3; 106/14.12; 106/14.13; 106/14.14
[58] Field of Search .................. 252/389.62, 109, 252/136, 173, 142, 147, 389.23, 389.24, 389.2, 389.3, 49.8, 79.3, DIG. 14, 407, 170; 427/355, 356, 368, 344; 134/3, 4, 2; 106/2, 3, 14.12, 14.13, 14.14

[56] References Cited

U.S. PATENT DOCUMENTS

| | | | |
|---|---|---|---|
| 1,574,406 | 2/1926 | Nelson | 252/142 |
| 3,150,007 | 9/1964 | Kovachy | 134/4 |
| 3,481,879 | 12/1969 | Salomone | 252/136 |
| 4,613,378 | 9/1986 | Christy | 134/2 |
| 4,738,876 | 4/1988 | George et al. | 427/299 |
| 4,756,766 | 7/1988 | Thrower | 134/3 |
| 5,108,514 | 4/1992 | Kisner | 134/27 |
| 5,282,900 | 2/1994 | McDonell et al. | 134/2 |

*Primary Examiner*—Douglas J. McGinty
*Attorney, Agent, or Firm*—Banner & Allegretti, Ltd.

[57] ABSTRACT

A stable, crystallizing solution of magnesium silicofluoride and oxalic acid is disclosed which can be incorporated into a complete maintenance system covering daily and weekly maintenance along with the periodic maintenance process of crystallization for preserving the appearance of polished marble flooring, terrazzo limestone, etc. The results which can be achieved through the use of this system are determined via an initial pretest with performance quantified using a glossmeter. Final performance results, the visible results of crystallization, are quantified via the glossmeter.

15 Claims, No Drawings

SOLUTION AND METHOD FOR CLEANING MARBLE SURFACES

BACKGROUND OF THE INVENTION

In a principal aspect, the present invention relates to an improved solution for cleaning marble surfaces and method for cleaning marble surfaces. Specifically, a stable crystallizing solution containing both magnesium silicofluoride and oxalic acid is disclosed, which can be incorporated into a complete maintenance system has been developed for preserving the appearance of polished marble flooring, terrazzo and limestone. This system covers daily and weekly maintenance along with a periodic maintenance process of crystallization. The performance of the system is quantified by glossmeter readings; that is, an initial pretest reading is compared with a final reading.

Marble is a natural stone often used as a flooring material. It is known for its beauty and permanence. Although commonly considered a very durable material requiring little maintenance, marble is very sensitive to abrasive soils and acid based liquids. Marble is easily scratched by abrasive soils; over time these scratches cause an overall dulling of the polished surface. The result is a marble floor which shows traffic patterns, and looks worn. Thus, various solutions for cleaning marble surfaces and methods for cleaning marble surfaces have been developed to maintain the aesthetically appealing appearance of the marble.

Most commonly, such solutions for cleaning marble surfaces and methods for cleaning marble surfaces comprise a crystallizing agent, that is, a compound that can chemically react with the marble.

A stable solution having both magnesium silicofluoride and oxalic acid is desirable, as solutions having only one of these two cleaning agents will not be sufficiently broad based in their application so as to ensure optimal performance.

A problem thus associated with solutions for cleaning marble surfaces and methods for cleaning marble surfaces that precede the present invention is, that to effect maximum cleaning, they require time-consuming application of two steps to ensure optimal cleaning. Specifically, to obtain a broad based application so as to ensure optimal cleaning, two cleaning solutions would be necessary and, because of the chemistry involved, these would have to be separately applied.

Another problem associated with solutions for cleaning marble surfaces and methods for cleaning marble surfaces that existed before the present invention is that many of them use only one crystallizing agent to restore the gloss on marble and other calcium carbonate containing surfaces.

Still a further problem thus associated with solutions for cleaning marble surfaces and methods for cleaning marble surfaces that precede the present invention is that they can damage or etch the marble if allowed to dry.

This problem is particularly acute where oxalic acid is used as a polishing agent. Historically, oxalic acid has been used to polish marble, as a slurry of this acid can restore the shine of marble. However, in previous applications of oxalic acid, damage to the marble can result if the slurry is permitted to dry.

Still a further problem associated with solutions for cleaning marble surfaces and methods for cleaning marble surfaces that existed before the present invention is that of optimally formulating the cleaning solution to be used.

Thus, a further problem associated with solutions for cleaning marble surfaces and methods for cleaning marble surfaces that existed before the present invention is that of selective performance. For example, magnesium silicofluoride has been used as a crystallizing agent because it reacts with the marble surface. Particularly when used in a buffing process, this acid improves the gloss of marble, hardens the marble, and improves the slip resistance of marble. However, magnesium silicofluoride alone does not permit the greatest breadth of application, as it does not react with all components common to marble and similar floor surfaces.

Yet another problem associated with solutions for cleaning marble surfaces and methods for cleaning marble surfaces that existed before the present invention is that of formulating the chemical to attack the particular impurity. Thus, improper selection of the solution components yields a cleaning solution that is not fully effective in cleaning.

Still a further problem associated with solutions for cleaning marble surfaces and methods for cleaning marble surfaces that existed before the present invention is that of determining the extent of improvement in the marble gloss so as to ensure that proper and effective cleaning has been performed.

Thus, a further problem associated with solutions for cleaning marble surfaces and methods for cleaning marble surfaces that existed before the present invention is that of formulating a combination of compounds that can provide excellent results in restoring and maintaining the gloss of marble while at the same time providing a cost efficient method of application.

Yet a further problem associated with solutions for cleaning marble surfaces and methods for cleaning marble surfaces that existed before the present invention is that they are not energy, time and reagent efficient, and thereby increase the expense and waste of operation.

Still a further problem associated with solutions for cleaning marble surfaces and methods for cleaning marble surfaces that existed before the present invention is that of excessive downtime and lost production caused by cleaning of the floor which results because use of the floor is interrupted.

An even further problem associated with solutions for cleaning marble surfaces and methods for cleaning marble surfaces that existed before the present invention is that of complex system design and expensive manufacture and use of materials.

Thus, various cleaning compounds and systems for cleaning marble and marble-like surfaces have been known for years. Generally, use of magnesium silicofluoride as a cleaning compound is known, as is use of oxalic acid, each of which have been shown to be crystallizing agents. However, the ability to preserve both in solution for extended period of time for use as cleaning solutions for surfaces such as marble, etc. has not been shown.

For example, U.S. Pat. No. 1,574,406, entitled "Composition for Cleaning Stone" and issued to Gustaf A. Nelson on Jun. 12, 1923, generally discloses a cleaning solution for use on granite, stone, marble, tile, etc. comprising ammonium fluoride, oxalic acid and water.

In addition, U.S. Pat. No. 3,150,007, entitled "Process for Cleaning Stone" and issued to Julius M. Kovachy on Sep. 22, 1964, generally discloses a process for cleaning stone utilizing a mixture of ammonium bifluoride, water, gum arabic, sodium bisulfate and barium bisulfate.

U.S. Pat. No. 3,481,879, entitled "Products for Cleaning Stone, Bricks, Concrete and Other Constructional Materials" and issued to Georges Salomone on Dec. 2, 1969, generally discloses a composition for cleaning stone, bricks, concrete and the like comprising water, ammonium bifluoride, barium chloride, magnesium fluosilicate, zinc fluosilicate, hydrofluoric acid and sodium fluosilicate with a stabilizing sugar.

U.S. Pat. No. 4,613,378, entitled "Method of Restoring Marble and Brick Surfaces" and issued to Lawrence Christy on Sep. 23, 1986, generally discloses a marble and brick surface restoring composition having trisodium phosphate, talc and sugar.

U.S. Pat. No. 4,738,876, entitled "Stone Surface Treating Methods and Compositions" and issued to Roger D. George, et al. on Apr. 19, 1988, generally discloses a process for treating stone surfaces such as marble or terrazzo. More particularly, this reference discloses an acid conditioning agent having an acid, such as oxalic acid, a surfactant and an organic solvent.

U.S. Pat. No. 4,756,766, entitled "Method of Cleaning and Conditioning Surfaces" and issued to John H. Thrower on Jul. 12, 1988, generally discloses a process for cleaning and conditioning marble and similar substances using a mixture including zinc sulfate solution and a thickener is used. The mixture cleans both mechanically, through abrasive action, as well as chemically, and prepares the marble for a second cleaning step, which is a solution of water, fluosilicates containing alkaline earth metals or zinc, and a monocarboxylic acid.

U.S. Pat. No. 5,108,514, entitled "In-Situ Method for Cleaning Swimming Pools without Draining the Water" and issued to Kim T. Kisner on Apr. 28, 1992, generally discloses a method for cleaning the interior surfaces of a swimming pool to remove stains, calcium deposits, and the like.

U.S. Pat. No. 5,282,900, entitled "Nonwoven Surface Treating Articles, System Including Same, and Method of Treating Calcium Carbonate-Containing Surfaces with Said System" and issued to James A. McDonell, et al. on Feb. 1, 1994, generally discloses the use of a cleaning pad used in combination with a system for treating calcium carbonate containing surfaces using an acidic crystallizing agent. This reference discloses using either magnesium hexafluorosilicate, oxalic acid, or hydrofluoric acid as a crystallizing agent, but does not teach or suggest a combination of magnesium hexafluorosilicate and oxalic acid.

The present invention constitutes a solution for cleaning marble surfaces and method for cleaning marble surfaces that seeks to overcome the problems discussed above, while at the same time providing a simple, easily manufactured solution and easily performed method that is readily adapted to a variety of applications, including the cleaning of various floor surfaces.

SUMMARY OF THE INVENTION

The present invention relates to a solution for cleaning marble surfaces and a method for cleaning marble surfaces. Specifically, a crystallizing solution having a combination of two heretobefore known cleaning compounds is disclosed. Although each of the two known cleaning compounds has been associated with solutions for cleaning marble surfaces, the two have not been shown to be successfully combined in one such solution, as they react with one another to form a precipitate.

Briefly, the present invention comprises an improved solution for cleaning marble surfaces and method for cleaning marble surfaces that seeks to overcome the problems associated with the prior art and facilitates cleaning of a multiplicity of calcareous surfaces.

Thus, it is an object of the present invention to provide an improved solution for cleaning marble surfaces and method for cleaning marble surfaces that utilizes both magnesium silicofluoride and oxalic acid, so as to be sufficiently broad based in their application so as to ensure optimal cleaning.

A further object of the present invention is to provide an improved solution for cleaning marble surfaces and method for cleaning marble surfaces that can accommodate a wide variety of floor surfaces and associated stains and cleaning problems and thereby permit use on many different types of floors.

Still a further object of the present invention is to provide an improved solution for cleaning marble surfaces and method for cleaning marble surfaces that is provided with cleaning means sufficiently focused so as to permit application of only one step to ensure optimal cleaning. Specifically, to obtain a broad based application so as to ensure optimal cleaning, only one cleaning solution is necessary and, because of the chemistry involved, this solution would contain two traditional crystallizers which heretobefore have not been successfully combined in a stable, floor cleaning application such as the one disclosed herein.

Another object of the present invention is to provide an improved solution for cleaning marble surfaces and method for cleaning marble surfaces that uses two cleaning acids to restore the gloss on marble and other calcium carbonate containing surfaces.

Still a further object of the present invention is to provide an improved solution for cleaning marble surfaces and method for cleaning marble surfaces that is provided with cleaning means sufficiently focused so as to permit ease of use.

Another object of the present invention is to provide an improved solution for cleaning marble surfaces and method for cleaning marble surfaces that will not damage or etch the marble during its application.

Thus, an object of the present invention is to provide an improved solution for cleaning marble surfaces and method for cleaning marble surfaces that is provided with cleaning means sufficiently focused so as to perform by combining the best attributes of a number of crystallizing agents that had not been previously combined in a floor cleaning solution. For example, magnesium silicofluoride has been used as a crystallizing agent which reacts with the marble surface. Particularly when used in a buffing process, this acid improves the gloss of marble, hardens the marble, and improves the slip resistance of marble. However, magnesium silicofluoride alone does not permit the greatest breadth of application, as it does not react with all stone impurities.

Thus, an object of the present invention is to provide an improved solution for cleaning marble surfaces and method for cleaning marble surfaces that contains, but is not limited to, magnesium silicofluoride as a crystallizing agent.

Still a further object of the present invention is to provide an improved solution for cleaning marble surfaces and method for cleaning marble surfaces that is provided with cleaning means which permits determination of the improvement in the marble gloss so as to ensure that proper and effective cleaning has been performed.

Another object of the present invention is to provide an improved solution for cleaning marble surfaces and method for cleaning marble surfaces that enables facile formulation of a combination of compounds that can provide excellent results in restoring and maintaining the gloss of marble while at the same time providing a cost efficient method of application.

A further object of the present invention is to provide an improved solution for cleaning marble surfaces and method for cleaning marble surfaces that is energy, time and reagent efficient, thereby reducing the expense and waste of operation.

Still a further object of the present invention is to provide an improved solution for cleaning marble surfaces and method for cleaning marble surfaces that reduces downtime and lost production to a minimum by facilitating cleaning of the floor so that use of the floor can be resumed.

A further object of the present invention is to provide an improved solution for cleaning marble surfaces and method for cleaning marble surfaces that is simply designed and inexpensive to manufacture, maintain and use.

These and other objects, advantages and features of the present invention will be apparent from the detailed description that follows.

DETAILED DESCRIPTION OF A PREFERRED EMBODIMENT

The following description facilitates a complete maintenance program consisting of daily, routine and periodic maintenance for polished marble, terrazzo, and other calcium containing surfaces.

Although in the preferred embodiment the present invention relates to an improved solution for cleaning marble surfaces and method for cleaning marble surfaces, marble is not the only stone material with which the teaching of this invention can be used. The invention is likewise adaptable for use with limestone, marble agglomerate and terrazzo. It is therefore to be understood that reference to marble throughout this disclosure shall likewise refer to these and other common materials with which the teachings hereof can be used.

Proper identification of the stone to be treated is helpful to a proper selection of methods and materials to be used in treating the floor surface.

Each natural stone has its own physical properties and characteristics. Hardness and acid sensitivity are two characteristics which are important to a proper selection of methods and materials to be used in treating the floor surface.

Granite is commonly used for commercial flooring. Granite is a harder stone than marble. On the Mohs Scale of Hardness, granite is a 4. As tested by ASTM C-241, granite is typically a 40 or greater. Visually, granite can be identified by its granular, or speckled appearance. Granite does not usually have veins as marble. Granite is available in a wide variety of colors. Granite is acid resistant. Granite will not be damaged by soft drinks, coffee, etc. This system is not intended for use on granite.

Limestone is often referred to as marble, because of its ability to take a polish. However, not all limestone will polish to a glass-like finish. The hardness of limestone varies from approximately 5 to 40 by the ASTM test. The vary soft limestones may not take a polish and have a honed finish. Limestone is often cream or tan in color, although there are exceptions. Limestone is sensitive to acid.

Both agglomerate and terrazzo are chips or pieces of stone, usually marble, in a concrete or resin matrix. Agglomerate contains a variety of stones and marble pieces of varying size. Agglomerate is pre-made and installed like marble. Terrazzo typically consists of one type of marble chip, and these are more uniform in size. Terrazzo flooring is poured in place and ground on site. Both agglomerate and terrazzo are sensitive to acid, although acid resistant agglomerates and terrazzos are available.

For polished stone, the present system is organized into three types of maintenance: preventative, routine, and periodic. The maintenance program for a particular building or floor will be determined by the type of soil and traffic, the expected appearance or sanitation level, and the amount of time available for floor maintenance.

Preventative maintenance is achieved by using matting and by daily dust mopping. Routine maintenance is achieved by damp mopping with a detergent. The principal attribute of the invention disclosed hereunder is used with periodic maintenance, that is, crystallization, which chemically reacts with the surface to be maintained.

Crystallization is a routine maintenance procedure for polished marble, limestone, terrazzo and agglomerate. Crystallization will improve the gloss, enhance the color, harden the surface, and improve the slip resistance.

The crystallization process uses a chemical which reacts with the marble surface, steel wool, and a rotary buffer. The action process is similar to spray buffing.

The crystallization process acts to form a hardened top layer to the marble surface. In so doing, any embedded soils or stains may become encapsulated within the marble. Therefore, it is recommended that soils and stains be removed from the floor prior to the crystallization process.

During the crystallization process, the crystallizing solution begins to chemically react with the marble or other surface to be cleaned. The mechanical action of the steel wool and the buffer generates heat which aids the reaction. The reaction is only at the surface; modifying and enhancing the very top layer of the marble. In addition to chemical action, the mechanical action of the steel wool polishes this new surface.

Because marble is a natural stone, each type of marble will respond differently to this process. Depending on the condition of the floor, it may be necessary to repeat the crystallization process 3 times initially, although later periodic maintenance should minimize the need for repeated applications.

To accurately quantify the resulting improvement in floor gloss, gloss readings should be taken with a glossmeter. Pre-application readings should be taken in both high and low traffic areas of the floor. The gloss meter shines a light onto the surface and measures how much light is reflected, in effect measuring the amount of shine on the floor. Gloss readings range from 0 to 100, 100 being a very high shine. Typical gloss readings in the high traffic areas may range from 20 to 30; gloss readings of other areas of the same floor may be greater than 80.

Pretesting permits prediction of the number of applications of crystallizer needed. Depending on the condition and type of marble, one to three applications may be needed. By determining the number of necessary applications in the pretest, cleaning is more efficiently performed.

Pretesting is typically performed on a one square foot area with the hand held buffer. First, the pretest area is wiped clean with the cleaning solution. Initial gloss readings on the test area are taken. An average of several readings provides the most reliable results. The hand held buffer is prepared with the steel wool in place. A small amount of crystallizing solution is sprayed onto the test area. Using the buffer, the chemical is immediately spread around the test area. As the chemical is working, the area will begin to appear hazy. The pretest area is buffed until the haze disappears and a gloss begins to appear. The area will be completely dry at this time.

The gloss is measured with the gloss meter. If the gloss is not at the desired level, the process is repeated on the same area until the desired gloss is obtained.

The daily and routine maintenance include the use of chemically treated dust mops and a neutral pH cleaner. Generally, a treated dust mop will remove a higher percentage of abrasive soils than either natural or synthetic dry mops.

The crystallization procedure is done on a periodic basis. The crystallization process uses a solution of magnesium silicofluoride and oxalic acid as crystallizing agents, utilizing phosphonic acid to keep the crystallizing agents in stable solution. This solution is used with steel wool and a rotary buffer. The process action is similar to spray buffing, which is routine maintenance process for floor finished floors. This crystallization process improves the gloss of the stone. Use of the crystallizer results in enhanced color, hardness of the surface and improved slip resistance of the marble floor.

The solution of the present invention consists of water, magnesium silicofluoride, oxalic acid and phosphonic acid. The phosphonic acid is commercially available as Dequest 2010. Thus, the solution disclosed is a uniquely stable solution of both magnesium silicofluoride and oxalic acid. This crystallizing compound is believed to yield better results than other commercial products based on one chemical crystallizing agent. The product chemistry as it reacts with the marble surface is believed to be as follows:

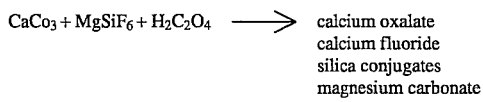

$$CaCo_3 + MgSiF_6 + H_2C_2O_4 \longrightarrow \text{calcium oxalate}$$
$$\text{calcium fluoride}$$
$$\text{silica conjugates}$$
$$\text{magnesium carbonate}$$

The product is based on the two acids. While marble is mainly comprised of calcium carbonate, the color in the marble is due to trace inorganics in the stone. Each trace inorganic encapsulated within the calcium carbonate matrix is subject to reaction with the solution. Typical trace reactions that could occur include: $Fe_2O_3 + F \rightarrow FeF_3$, $Fe_2O_3 + H_2C_2O_4 \rightarrow FeC_2O_4$. Reduced iron complexes will improve the gloss of the marble in the same manner as acid washing removes the oxidation from metal.

The use of phosphonic acid, Dequest 2010, acts to prevent the agglomeration of the acid salts within the solution of the present invention. The exact mechanism is not known to the inventors hereof, but is believed to occur at below stoichiometric amounts. By including a deflocculant to the product, the two active ingredients remain in solution.

Below is the optimal and an acceptable range of components for the preferred embodiment of the crystallizer solution:

| Crystallizer Formulation | Optimal Wt. % | Acceptable Wt. % |
| --- | --- | --- |
| Water | 89 | 81.5–89 |
| Magnesium silicofluoride | 10 | 10–15 |
| Oxalic Acid | 0.5 | 0.5–2.0 |
| Phosphonic acid | 0.5 | 0.5–1.5 |

As the two raw materials are permanently dissolved within the solution, it is believed that all disassociated ions are reactive. Accordingly, a total of six fluoride, one oxalate, one silicate and one magnesium ion are believed to be available as chemical reactants per each molecule of raw material in the solution.

It is believed that the complete dissolution of all reactive ions results in superior performance. Presently available competitive products which are not completely dissolved require frequent agitation. This agitation results in some dissolution, but the undissolved solids are not fully available to react with the marble surface.

To quantify the improvement in gloss of the floor, an initial inspection of the floor. The condition of the floor is measured with a fixed angle glossmeter. A small area, for example, one square foot, is pretested. This is performed with a random orbital buffer, grade 0 or 1 steel wool pad, and the cleaning solution described herein.

In the preferred embodiment, the solution is sprayed onto the test area (0.025 oz/ft$^2$) and then buffed through complete dryness to a polish. The change in appearance of the floor is measured by the glossmeter. Repeated applications are made with results of each application quantified. Through the pretest, the outcome of the crystallization process can be effectively predicted.

The crystallization process comprises the spray buff process, roto, steel wool, and crystallizer solution. The crystallizer solution is applied at a rate of 0.1 oz. per 8 ft.$^2$. The crystallizer is buffed through dryness to a polish.

Finally, using the glossmeter, the results of the large scale crystallization process are quantified.

The following describes the use of the invention for cleaning various floor surfaces.

Marble is a natural stone which is capable of taking a polish. There are over 300 classified types of marble, varying in color, veining, hardness, and soundness. Although marble is commonly considered very durable, marble is in fact very sensitive and requires proper maintenance.

For example, marble is sensitive to abrasives. Traffic patterns will appear on marble floors from tracking in dirt, sand and grit. Additionally, marble is sensitive to acids. Soft drinks, coffee, fruit juice, etc. will etch the marble surface. Accordingly, marble maintenance extends the amount of time before restoration is needed. Marble restoration, or grinding and polishing, is an extremely labor intensive and costly process.

EXAMPLES

Below are data from 6 field test sites and 3 pretest performances. The charts show pretest gloss readings and the gloss of the floor at the completion of the job.

Application Example No. 1:
LOCATION: LIBERTYVILLE H.S.
SIZE: 72 SQ. FT.
FLOOR: DARK RED TERRAZZO LANDING

| PASS | SYSTEM | TIME | GLOSS | AREA | COMMENTS |
|---|---|---|---|---|---|
| Initial |  |  | 2–6 | 72 sq. ft | Freshly stripped |
| #2 | Crystallizer, grade 1 steel wool | 15 min | 15–25 | 36 sq. ft | Only ½ of landing, do 2 passes |
| #4 | Crystallizer, grade 1 steel wool | 15 min | 27–35 | 36 sq. ft |  |
| #6 | Crystallizer, grade 1 steel wool | 15 min | 25–35 | 36 sq. ft |  |
| #7 | Crystallizer, grade 1 steel wool | 10 min | 25–35 | 36 sq. ft | Ave gloss 30 |
| #8 | Crystallizer, grade 0 steel wool | 10 min | 25–40 | 36 sq. ft |  |
| Initial |  |  | 25–35 |  |  |
| #9 | Crystallizer, grade 1 steel wool | 35 min | 30–40 | 72 sq. ft |  |
| #10 | Crystallizer, grade 1 steel wool | 25 min | 30–45 | 72 sq. ft |  |
| #11 | Crystallizer, grade 0 steel wool | 25 min | 35–45 | 72 sq. ft |  |
| #12 | Dust & wet mop, buff w/white pad | 10 min | 38.06* | 72 sq. ft | Ave of 46 readings |
| Total |  | 160 min | +34 |  | Fresh Endure on top landing: gloss 57 |
| STATUS |  |  | 21.56 | 72 sq. ft | Ave of 25 readings. Gloss of Endure on upper landing, 17.74 ave. Much salt on floor, fresh snow. |

Application Example No. 2:
LOCATION: RICH TOWNSHIP EAST H.S.
SIZE: 50 SQ. FT.
FLOOR: TOP STAIR LANDING

| PASS | SYSTEM | TIME | GLOSS | AREA | COMMENTS |
|---|---|---|---|---|---|
| Initial |  |  | 15–30 | 60 sq. ft | Area behind door has little to no traffic. |
| #1 | Crystallizer, grade 0 steel wool | 10 min | 40–50 | 60 sq. ft | Floor finish is not used in this area. |
| #2 | Crystallizer, grade 0 steel wool | 10 min | 53 ave | 60 sq. ft |  |
| #3 | Crystallizer, grade 0 steel wool | 10 min | 53–60 |  |  |
| Total |  | 30 min | +34 |  |  |
| STATUS |  |  | 33.52 |  | Ave of 21 readings. Much salt on the floor. |

Application Example No. 3:
LOCATION: RICH TOWNSHIP EAST H.S.
SIZE: 60 SQ. FT.
FLOOR: MIDDLE STAIR LANDING

| PASS | SYSTEM | TIME | GLOSS | AREA | COMMENTS |
|---|---|---|---|---|---|
| Initial |  |  | 15–27 | 60 sq. ft | As above |
| #1 | Crystallizer, grade 0 steel wool | 10 min | 31–31 | 60 sq. ft |  |
| #2 | Crystallizer, grade 0 steel wool | 10 min | 35–50 | 60 sq. ft |  |
| #3 | Crystallizer, grade 0 steel wool | 15 min | 45–60 | 60 sq. ft |  |
| #4 | Crystallizer, grade 0 steel wool | 15 min | 45–60 | 60 sq. ft |  |
| #5 | Wash and dry buff w/white pad | 5 min | 50–60 | 60 sq. ft |  |
| Total |  | 55 min | +34 |  |  |
| STATUS |  |  | 35.71 |  | Ave 21 readings. Mush salt on the floor |

Application Example No. 4:
LOCATION: RICH TOWNSHIP EAST
SIZE: 36 SQ. FT.
FLOOR: OTHER STAIR LANDING

| PASS | SYSTEM | TIME | GLOSS | AREA | COMMENTS |
|---|---|---|---|---|---|
| Initial | | | 18–25 | 36 sq. ft. | As above |
| #1 | Crystallizer, grade 0 steel wool | 5 min | | 36 sq. ft. | |
| #2 | Crystallizer, grade 0 steel wool | 5 min | 30–40 | 36 sq. ft. | |
| #3 | Crystallizer, grade 0 steel wool | 5 min | | 36 sq. ft. | |
| #4 | Crystallizer, grade 0 steel wool | 5 min | 40–50 | 36 sq. ft. | |
| #5 | Crystallizer, grade 0 steel wool | 5 min | | 36 sq. ft. | |
| #6 | Crystallizer, grade 0 steel wool | 5 min | 50–60 | 36 sq. ft. | |
| #7 | Wash, dry buff w/white pad | 5 min | 50–60 | 36 sq. ft. | Rt. side gloss: 55–60 |
| Total | | 35 min | +34 | 36 sq. ft. | Lt. side gloss: 50–60 |
| STATUS | | | 38.07 | | Ave 15 readings. Much salt on the floor |

Application Example No. 5:
LOCATION: LIBERTYVILLE H.S.
SIZE: 161 SQ. FT.
FLOOR: WHITE TERRAZZO DOORWAY/LANDING

| PASS | SYSTEM | TIME | GLOSS | AREA | COMMENTS |
|---|---|---|---|---|---|
| Initial | | | 3–7 | 161 sq. ft. | Freshly stripped, previously coated |
| #1 | Crystallizer, grade 0 steel wool | 30 min | 15–30 | 161 sq. ft. | with Endure Prior to stripping, gloss |
| #2 | Crystallizer, grade 0 steel wool | 35 min | 30–45 | 161 sq. ft. | of 23–40 |
| #3 | Crystallizer, grade 0 steel wool | 35 min | 30–45 | 161 sq. ft. | |
| #4 | Dust & wet mop | 10 min | | 161 sq. ft. | |
| #5 | Crystallizer, grade 1 steel wool | 30 min | 30–45 | 161 sq. ft. | |
| #6 | Crystallizer, grade 1 steel wool | 30 min | 30–50 | 161 sq. ft. | |
| #7 | Wash, dry buff w/white pad | 15 min | 35–50 | 161 sq. ft. | Gloss 35–45 by door, 40–50 by steps |
| #8 | Crystallizer, grade 0 steel wool | 20 min | | 161 sq. ft. | Traffic patterns only |
| #9 | Crystallizer, grade 0 steel wool | 20 min | | 161 sq. ft. | Traffic patterns only |
| #10 | Dry & wet mop, buff w/white pad | 10 min | 46.11 | 161 sq. ft. | Ave. gloss of 44 readings |
| Total | | 235 min | +41 | 161 sq. ft. | Endure in hall outside doors, gloss of 31–34 |
| | | | | 161 sq. ft. | Ave of 34 readings. Endure in hall outside doors, gloss ave 17. Much salt on floor, fresh snow. |
| STATUS | | | 21.67 | 161 sq. ft. | |

Application Example No. 6:
PRETEST
RICH TOWNSHIP HIGH SCHOOL EAST
TOP STAIRWELL LANDING
WHITE TERRAZZO

| PASS | SYSTEM | GLOSS | COMMENTS |
|---|---|---|---|
| Initial | | 20–24 | |
| 1 pass | Crystallizer, grade 0 steel wool | 27–37 | |
| 2 pass | Crystallizer, grade 0 steel wool | 36–46 | |
| 3 pass | Crystallizer, grade 0 steel wool | 43–46 | |
| JOB | Crystallizer, grade 0 steel wool | 53–60 | Actual results of the crystallization process |

Application Example No. 7:
PRETEST
COPPELL SCHOOL DISTRICT
HALLWAY BY VAULT
BLACK MARBLE

| PASS | SYSTEM | GLOSS | COMMENTS |
|---|---|---|---|
| Initial | | 10.42 | Ave. of 12 readings |
| 1 pass | Crystallizer, grade 1 steel wool | 26–40 | |
| 2 pass | Crystallizer, grade 1 steel wool | 40–50 | |
| 3 pass | Crystallizer, grade 1 steel wool | 40–50 | |
| 4 pass | Crystallizer, grade 0 steel wool | 50–55 | |
| 5 pass | Crystallizer, grade 0 steel wool | 51–55 | |
| JOB | Crystallizer, grade 0 steel & 1 wool | 58.05 | Actual results of crystallization process. Results are ave. of 22 readings. |

Application Example No. 8:
PRETEST
MacNEAL HOSPITAL
ELEVATOR IN LOBBY
RED MARBLE

| PASS | SYSTEM | GLOSS | COMMENTS |
|---|---|---|---|
| Initial | | 8 | Freshly stripped floor. |
| 1 pass | Crystallizer, grade 0 steel wool | 35 | |
| 2 pass | Crystallizer, grade 0 steel wool | 55 | |
| 3 pass | Crystallizer, grade 0 steel wool | 60 | |
| JOB | Crystallizer, grade 0 steel wool | 59–67 | Actual results of crystallization process. |
| STATUS | | 58–67 | Gloss readings of floor 1 week post crystallization |

Application Example No. 9:
LOCATION: COPPELL SCHOOL DISTRICT
SIZE: 100 SQ. FT.
FLOOR: BLACK MARBLE HALLWAY

| PASS | SYSTEM | TIME | GLOSS | AREA | COMMENTS |
|---|---|---|---|---|---|
| Initial | | | 10.42 ave | 100 sq. ft. | Freshly stripped floor. Endure in main lobby has gloss of 74.79 ave. |
| | | | | 100 sq. ft. | Ave. of 17 readings |
| #1–4 | Crystallizer, grade 0 steel wool | 65 min | 48.29 | 100 sq. ft. | Ave. of 22 readings |
| #5–6 | Crystallizer, grade 1 steel wool | 40 min | 58.05 | 100 sq. ft. | Gloss continues to improve, intensity |
| Total | | 105 min | +47.63 | 100 sq. ft. | of color is greater than in lobby. |
| | | | | 100 sq. ft. | |

Application Example No. 10:
LOCATION: GENETSKI HOME
SIZE: 120 SQ. FT & 40 SQ. FT BATH
FLOOR: WHITE TERRAZZO, LARGE PIECES OF MARBLE

| PASS | SYSTEM | TIME | GLOSS | AREA | COMMENTS |
|---|---|---|---|---|---|
| Initial | | | 12–18 | 160 sq. ft. | Floor is 25 yrs old. |
| #1 | Clean w/white pad, marble cleaner | 60 min | 15–25 | 160 sq. ft. | Floor is very dirty with embedded soils |
| #2 | Crystallizer, grade 1 steel wool | * | * | 160 sq. ft. | |
| #3 | Crystallizer, grade 1 steel wool | * | * | 160 sq. ft. | |
| #4 | Crystallizer, grade 1 steel wool | * | * | 160 sq. ft. | |
| #5 | Crystallizer, grade 1 steel wool | 90 min | 45–55 | 160 sq. ft. | |
| #6 | Crystallizer, grade 0 steel wool | * | * | 160 sq. ft. | |
| #7 | Crystallizer, grade 0 steel wool | 45 min | 58.45 | 160 sq. ft. | Ave. of 40 readings |
| #8 | Clean up | 30 min | | | |
| Total | | 8 man hrs. | +43.5 | | Due to edges and bath, 1 man used 6 inch. |
| STATUS | | | 49.25 | 160 sq. ft. | Ave. of 28 readings |

Application Example No. 11:
LOCATION: THORNTON FRACTIONAL SOUTH
SIZE: 60 SQ. FT.
FLOOR: WHITE TERRAZZO LANDING

| PASS | SYSTEM | TIME | GLOSS | AREA | COMMENTS |
| --- | --- | --- | --- | --- | --- |
| Initial | | | 1–6 | 60 sq. ft | 35 yr. old, freshly stripped |
| #1 | Crystallizer, grade 0 steel wool | 12 min | 14–20 | 60 sq. ft | Stairwell to rt. 15–23; stairwell |
| #2 | Crystallizer, grade 0 steel wool | 13 min | 25–30 | 60 sq. ft | ahead also 15–23 |
| #3 | Crystallizer, grade 0 steel wool | 15 min | 25–30 | 60 sq. ft | |
| #4 | Wash w/marble cleaner, flip pad | 10 min | | 60 sq. ft | |
| #5 | Crystallizer, grade 0 steel wool | 15 min | 30–40 | 60 sq. ft | |
| #6 | Crystallizer, grade 0 steel wool | 18 min | 30–40 | 60 sq. ft | |
| #7 | Wash w/marble cleaner | 12 min | | 60 sq. ft | |
| #8 | Crystallizer, grade 1 steel wool | 15 min | | 60 sq. ft | |
| #9 | Crystallizer, grade 1 steel wool | 15 min | 30–45 | 60 sq. ft | |
| #10 | Crystallizer, grade 1 steel wool | 20 min | 30–45 | 60 sq. ft | |
| #11 | Crystallizer, grade 0 steel wool | 20 min | 33–45 | 60 sq. ft | |
| #13 | Wash & dry buff w/white pad | 25 min | 44.2 ave | 60 sq. ft | Ave of 28 readings |
| Total | | 190 min | +40 | | |
| STATUS | | | 33.83 | 60 sq. ft | Ave of 29 readings. Stairwell to rt 5–15, stairs ahead 8–15 |

Application Example No. 12:
LOCATION: ST. XAVIER
SIZE: 900 SQ. FT.
FLOOR: RED/BROWN MARBLE

| PASS | SYSTEM | TIME | GLOSS | AREA | COMMENTS |
| --- | --- | --- | --- | --- | --- |
| Initial | | | 1–4 | 900 sq. ft. | 2 rotos for job |
| | Crystallizer, grade 1 steel wool | 60 min | | 160 sq. ft. | |
| | Crystallizer, grade 1 steel wool | 120 min | 25–30 | 300 sq. ft. | |
| | Crystallizer, grade 1 steel wool | 270 min | 30–50 | 900 sq. ft. | |
| | Dust mop, dry buff white pad | 330 min | 43.7 ave | 900 sq. ft. | Gloss black squares 55–60; |
| Total | | 11 hrs | +40 | 900 sq. ft. | Gloss major areas 40–50; |
| | | | | 900 sq. ft. | Gloss marble w/lots of grey 30–40 |
| STATUS | | | 39.88 | 900 sq. ft. | Floor is coated in salt, had to |
| | | | | 900 sq. ft. | wash 9 sq. ft. to get readings. |
| | | | | 900 sq. ft. | Black square 49–55 |
| STATUS | | | 23.69 | 900 sq. ft. | Due to harsh winter & high |
| | | | | 900 sq. ft. | use of salt floor required |
| | | | | 900 sq. ft. | showerscrub w/white pad. Gloss ave of 13 readings |
| 3 pass | Crystallizer, grade 0 steel wool | 105 min | 52.75 | 336 sq. ft. | Ave of 24 readings |
| 3 pass | Crystallizer, 3M marble pad | 100 min | 52.36 | 336 sq. ft. | Ave of 22 readings |
| 3 pass | Crystallizer, grade 0 steel wool | 110 min | 55.12 | 336 sq. ft. | Ave of 16 readings |
| TOTAL | 3 Passes Entire Floor | 330 min | 53.23 | 900 sq. ft. | Ave of 62 readings over entire floor Black squares av. 61.82 |

The invention therefore provides an improved solution for cleaning marble surfaces and method for cleaning marble surfaces. The foregoing detailed description provides the preferred embodiment of the invention. It is clear, however, that the preferred embodiment may be variously modified. Therefore, to particularly and distinctly claim the subject matter regarded as invention, the following claims conclude this specification.

What is claimed is:

1. An aqueous crystallizing solution comprising about 10–15 percent by weight of magnesium silicofluoride, about 0.5–2.0 percent by weight of oxalic acid, and about 0.5–1.5 percent by weight of phosphonic acid.

2. A solution according to claim 1, wherein the magnesium silicofluoride is present in a concentration of about 10 percent by weight.

3. A solution according to claim 1, wherein the oxalic acid is present in a concentration of about 0.5 percent by weight.

4. A solution according to claim 1, wherein the phosphonic acid is present in a concentration of about 0.5 percent by weight.

5. A solution according to claim 1, wherein the magnesium silicofluoride is present in a concentration of about 10 percent by weight, the oxalic acid is present in a concentration of about 0.5 percent by weight, and the phosphonic acid is present in a concentration of about 0.5 percent by weight.

6. A method of cleaning floor materials containing calcium carbonate comprising, in combination:

spraying the solution according to claim 1 onto the floor, and buffing the floor and solution with steel wool through complete dryness to a polish.

7. A method of cleaning floor materials containing calcium carbonate comprising, in combination:

spraying the solution according to claim 2 onto the floor, and buffing the floor and solution with steel wool through complete dryness to a polish.

8. A method of cleaning floor materials containing calcium carbonate comprising, in combination:

spraying the solution according to claim 3 onto the floor, and buffing the floor and solution with steel wool through complete dryness to a polish.

9. A method of cleaning floor materials containing calcium carbonate comprising, in combination:

spraying the solution according to claim 4 onto the floor, and buffing the floor and solution with steel wool through complete dryness to a polish.

10. A method of cleaning floor materials containing calcium carbonate comprising, in combination:

spraying the solution according to claim 5 onto the floor, and buffing the floor and solution with steel wool through complete dryness to a polish.

11. The method of cleaning floor materials containing calcium carbonate according to claim 6, wherein the crystallizing solution is sprayed onto the floor in an amount of at least about 0.1 oz. per 8 ft.$^2$.

12. The method of cleaning floor materials containing calcium carbonate according to claim 7, wherein the crystallizing solution is sprayed onto the floor in an amount of at least about 0.1 oz. per 8 ft.$^2$.

13. The method of cleaning floor materials containing calcium carbonate according to claim 8, wherein the crystallizing solution is sprayed onto the floor in an amount of at least about 0.1 oz. per 8 ft.$^2$.

14. The method of cleaning floor materials containing calcium carbonate according to claim 9, wherein the crystallizing solution is sprayed onto the floor in an amount of at least about 0.1 oz. per 8 ft.$^2$.

15. The method of cleaning floor materials containing calcium carbonate according to claim 10, wherein the crystallizing solution is sprayed onto the floor in an amount of at least about 0.1 oz. per 8 ft.$^2$.

* * * * *